(12) United States Patent
Hori et al.

(10) Patent No.: US 11,627,614 B2
(45) Date of Patent: Apr. 11, 2023

(54) TERMINAL APPARATUS, BASE STATION APPARATUS, AND METHOD

(71) Applicants: Sharp Kabushiki Kaisha, Sakai (JP); FG Innovation Company Limited, New Territories (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 20 days.

(21) Appl. No.: 17/263,614

(22) PCT Filed: Aug. 5, 2019

(86) PCT No.: PCT/JP2019/030632
§ 371 (c)(1),
(2) Date: Jan. 27, 2021

(87) PCT Pub. No.: WO2020/031934
PCT Pub. Date: Feb. 13, 2020

(65) Prior Publication Data
US 2021/0298097 A1  Sep. 23, 2021

(30) Foreign Application Priority Data
Aug. 6, 2018 (JP) .............................. JP2018-147659

(51) Int. Cl.
*H04W 76/10* (2018.01)
*H04W 76/27* (2018.01)

(52) U.S. Cl.
CPC ........... *H04W 76/10* (2018.02); *H04W 76/27* (2018.02)

(58) Field of Classification Search
CPC ..... H04W 76/10; H04W 76/27; H04W 76/19; H04W 76/22; H04W 92/10; H04W 76/12; H04W 28/18; H04W 92/14
See application file for complete search history.

(56) References Cited

U.S. PATENT DOCUMENTS

| | | | |
|---|---|---|---|
| 2009/0092079 A1* | 4/2009 | Marinier | H04L 1/1874 370/328 |
| 2010/0034171 A1* | 2/2010 | Pelletier | H04W 76/27 370/331 |

(Continued)

OTHER PUBLICATIONS

Official Communication issued in International Patent Application No. PCT/JP2019/030632, dated Sep. 3, 2019.
(Continued)

*Primary Examiner* — Will W Lin
(74) *Attorney, Agent, or Firm* — Keating & Bennett, LLP

(57) ABSTRACT

A terminal apparatus for communicating with a base station apparatus, the terminal apparatus including: a receiver configured to receive, from the base station apparatus, a Radio Resource Control (RRC) reconfiguration message including a radio bearer configuration information element; and a processing unit configured to, in a case that a radio bearer identity included in the radio bearer configuration information element is not part of a configuration of the terminal apparatus and that the radio bearer configuration information element includes a Service Data Adaptation Protocol (SDAP) configuration information element and that a Protocol Data Unit (PDU) session information element included in the SDAP configuration information element is not part of the configuration of the terminal apparatus, indicate to upper layers that a user-plane resource is configured for a PDU session corresponding to a value of the PDU session information element.

6 Claims, 11 Drawing Sheets

(56) References Cited

U.S. PATENT DOCUMENTS

| | | | | |
|---|---|---|---|---|
| 2014/0056243 | A1* | 2/2014 | Pelletier | H04W 72/1263 370/329 |
| 2019/0141591 | A1* | 5/2019 | Wu | H04W 36/04 |
| 2019/0159021 | A1* | 5/2019 | Zhao | H04W 80/02 |
| 2019/0313262 | A1* | 10/2019 | Huang-Fu | H04L 47/2441 |
| 2019/0327642 | A1* | 10/2019 | Peng | H04W 28/0812 |
| 2019/0327772 | A1* | 10/2019 | Luo | H04W 76/15 |
| 2020/0260325 | A1* | 8/2020 | Futaki | H04W 76/22 |
| 2020/0274679 | A1* | 8/2020 | Futaki | H04W 24/10 |

OTHER PUBLICATIONS

NTT Docomo, Inc., "New WID on New Radio Access Technology", 3GPP TSG RAN Meeting #75, RP-170855, Mar. 6-9, 2017, 8 pages.

"3rd Generation Partnership Project; Technical Specification Group Services and System Aspects; System Architecture for the 5G System; Stage 2 (Release 15)", 3GPP TS 23.501 V15.2.0, Jun. 2018, pp. 1-216.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.7.0, Jun. 2018, pp. 1-331.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, pp. 1-791.

"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.0.0, Jul. 2018, pp. 1-51.

"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.1.0, Jul. 2018, pp. 1-45.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.2.0, Jul. 2018, pp. 1-126.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.2.0, Jun. 2018, pp. 1-55.

"3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.

"3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-303.

"3rd Generation Partnership Project; Technical Specification Group Radio Access Network; NR; Packet Data Convergence Protocol (PDCP) specification (Release 15)", 3GPP TS 38.323 V15.2.0, Jun. 2018, pp. 1-26.

"3rd Generation Partnership Project; Technical Specification Group Radio Access Network; NR; Radio Link Control (RLC) protocol specification (Release 15)", 3GPP TS 38.322 V15.2.0, Jun. 2018, pp. 1-33.

"3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.3.0, Mar. 2017, pp. 1-386.

"3rd Generation Partnership Project; Technical Specification Group Services and System Aspects; Procedures for the 5G System; Stage 2 (Release 15)", 3GPP TS 23.502 V15.2.0, Jun. 2018, pp. 1-308.

"3rd Generation Partnership Project; Technical Specification Group Radio Access Network; E-UTRA and NR; Service Data Adaptation Protocol (SDAP) specification (Release 15)", 3GPP TS 37.324 V15.0.0, Jun. 2018, pp. 1-13.

LG Electronics Inc., "Indication for the establishment or release of SDAP entity", 3GPP TSG-RAN WG2 NR AH#4, R2-1810668, Jul. 2-6, 2018, 3 pages.

LG Electronics Inc., "Discussion on SDAP entity handling", 3GPP TSG-RAN2 Meeting#102, R2-1808626, May 21-25, 2018, pp. 1-6.

Ericsson (Rapporteur), "Introduction of SA", 3GPP TSG-WG2 Meeting #102AH, R2-1810388, Jul. 2-6, 2018, 406 pages.

Huawei, "Introduction of LTE connectivity to 5GCN", 3GPP TSG-RAN2 Meeting #99bis, R2-1711584, Oct. 9-13, 2017, 10 pages.

"3rd Generation Partnership Project; Technical Specification Group Radio Access Network; E-UTRA and NR; Service Data Adaptation Protocol (SDAP) specification (Release 15)", 3GPP TS 37.324 V2.0.2, Jun. 2018, pp. 1-13.

* cited by examiner

```
<OMITTED>
RadioBearerConfig ::=       SEQUENCE {
     <PARTLY OMITTED>
    drb-ToAddModList             DRB-ToAddModList      OPTIONAL,  -- Need N
    drb-ToReleaseList            DRB-ToReleaseList     OPTIONAL,  -- Need N
     <PARTLY OMITTED>
}
     <PARTLY OMITTED>
DRB-ToAddModList ::=  SEQUENCE (SIZE (1..maxDRB)) OF DRB-ToAddMod
DRB-ToAddMod ::=  SEQUENCE {
    cnAssociation            CHOICE {
        eps-BearerIdentity       INTEGER (0..15),    -- EPS-DRB-Setup
        sdap-Config              SDAP-Config          -- 5GC
    }                              OPTIONAL,  -- Cond DRBSetup
    drb-Identity             DRB-Identity,
     <PARTLY OMITTED>
    pdcp-Config              PDCP-Config            OPTIONAL,   -- Cond PDCP
    ...
}
     <PARTLY OMITTED>
DRB-ToReleaseList ::=  SEQUENCE (SIZE (1..maxDRB)) OF DRB-Identity
     <PARTLY OMITTED>
DRB-Identity ::=  INTEGER (1..32)
SDAP-Config ::=     SEQUENCE {
     <PARTLY OMITTED>
    pdu-Session              PDU-SessionID,
    mappedQoS-FlowsToAdd     SEQUENCE (SIZE (1..maxNrofQFIs)) OF QFI
    mappedQoS-FlowsToRelease SEQUENCE (SIZE (1..maxNrofQFIs)) OF QFI
    ...
}
<OMITTED>
```

FIG. 7

TERMINAL APPARATUS, BASE STATION APPARATUS, AND METHOD

TECHNICAL FIELD

The present invention relates to a terminal apparatus, a base station apparatus, and a method.

This application claims priority based on JP 2018-147659 filed on Aug. 6, 2018, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, v15.2.0, "System Architecture for the 5G System; Stage 2"
NPL 3: 3GPP TS 36.300, v14.7.0, "Evolved Universal Terrestrial Radio Access (E-UTRA) and Evolved Universal Terrestrial Radio Access Network (E-UTRAN); Overall description; Stage 2"
NPL 4: 3GPP TS 36.331, v15.2.2, "Evolved Universal Terrestrial Radio Access (E-UTRA); Radio Resource Control (RRC); Protocol specifications"
NPL 5: 3GPP TS 36.323, v15.0.0, "Evolved Universal Terrestrial Radio Access (E-UTRA); Packet Data Convergence Protocol (PDCP) specification"
NPL 6: 3GPP TS 36.322, v15.1.0, "Evolved Universal Terrestrial Radio Access (E-UTRA); Radio Link Control (RLC) protocol specification"
NPL 7: 3GPP TS 36.321, v15.2.0, "Evolved Universal Terrestrial Radio Access (E-UTRA); Medium Access Control (MAC) protocol specification"
NPL 8: 3GPP TS 37.340, v15.2.0, "Evolved Universal Terrestrial Radio Access (E-UTRA) and NR; Multi-Connectivity; Stage 2"
NPL 9: 3GPP TS 38.300, v15.2.0, "NR; NR and NG-RAN Overall description; Stage 2" NPL 10: 3GPP TS 38.331, v15.2.1, "NR; Radio Resource Control (RRC); Protocol specifications"
NPL 11: 3GPP TS 38.323, v15.2.0, "NR; Packet Data Convergence Protocol (PDCP) specification"
NPL 12: 3GPP TS 38.322, v15.2.0, "NR; Radio Link Control (RLC) protocol specification"
NPL 13: 3GPP TS 38.321, v15.2.0, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502, v15.2.0, "Procedure for 5G System; Stage 2" NPL 16: 3GPP TS 37.324, v15.0.0, "NR; Service Data Adaptation Protocol (SDAP) specification"

SUMMARY OF INVENTION

Technical Problem

As one of technical studies for NR, a study has been conducted about a radio access layer protocol for Quality of Service (QoS) management between a radio access layer of NR and an upper layer that is an Internet Protocol (IP) layer or a layer higher than the IP layer.

However, there is a problem in that incorrect QoS management between the upper layer and the radio access layer prevents efficient communication between a base station apparatus and a terminal apparatus.

In view of the circumstances described above, an object of an aspect of the present invention is to provide a terminal apparatus capable of efficiently communicating with a base station apparatus, a base station apparatus, a method used for the terminal apparatus, and a method used for the base station apparatus.

Solution to Problem

In order to accomplish the object described above, an aspect of the present invention is contrived to provide the following measures. Specifically, a terminal apparatus for communicating with a base station apparatus, the terminal apparatus including: a receiver configured to receive, from the base station apparatus, a Radio Resource Control (RRC) reconfiguration message including a radio bearer configuration information element; and a processing unit configured to, in a case that a radio bearer identity included in the radio bearer configuration information element is not part of a configuration of the terminal apparatus and that the radio bearer configuration information element includes a Service Data Adaptation Protocol (SDAP) configuration information element and that a Protocol Data Unit (PDU) session information element included in the SDAP configuration information element is not part of the configuration of the terminal apparatus, indicate to upper layers that a user-plane resource is configured for a PDU session corresponding to a value of the PDU session information element.

An aspect of the present invention provides a base station apparatus for communicating with a terminal apparatus, the base station apparatus including: a transmitter configured to transmit a Radio Resource Control (RRC) reconfiguration message to the terminal apparatus; and a processing unit configured to include a radio bearer configuration information element in the RRC reconfiguration message to cause the terminal apparatus to perform processing, wherein the processing includes processing of, in a case that a radio bearer identity included in the radio bearer configuration information element is not part of a configuration of the terminal apparatus and that the radio bearer configuration information element includes a Service Data Adaptation Protocol (SDAP) configuration information element and that a Protocol Data Unit (PDU) session information element included in the SDAP configuration information element is not part of the configuration of the terminal apparatus, indicating to upper layers that a user-plane resource is configured for a PDU session corresponding to a value of the PDU session information element.

An aspect of the present invention provides a method for a terminal apparatus for communicating with a base station apparatus, the method including: receiving, from the base station apparatus, a Radio Resource Control (RRC) reconfiguration message including a radio bearer configuration information element; and in a case that a radio bearer identity included in the radio bearer configuration information element is not part of a configuration of the terminal apparatus and that the radio bearer configuration information element includes an SDAP configuration information element and that a PDU session information element included in the SDAP configuration information element is not part of the configuration of the terminal apparatus, indicating to upper layers that a user-plane resource is configured for a PDU session corresponding to a value of the PDU session information element.

An aspect of the present invention provides a method for a base station apparatus for communicating with a terminal apparatus, the method including the steps of: transmitting an RRC reconfiguration message to the terminal apparatus; and including a radio bearer configuration information element in the RRC reconfiguration message to cause the terminal apparatus to perform processing, wherein the processing includes processing of, in a case that a radio bearer identity included in the radio bearer configuration information element is not part of a configuration of the terminal apparatus and that the radio bearer configuration information element includes an SDAP configuration information element and that a PDU session information element included in the SDAP configuration information element is not part of the configuration of the terminal apparatus, indicating to upper layers that a user-plane resource is configured for a PDU session corresponding to a value of the PDU session information element.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, complexity of protocol processing is reduced, enabling efficient communication.

BRIEF DESCRIPTION OF DRAWINGS

FIG. 7 is a diagram illustrating an example of information related to radio bearer configurations and an Abstract Syntax Notation One (ASN. 1) of the information in each embodiment of the present invention.

DESCRIPTION OF EMBODIMENTS

Hereinafter, an embodiment of the present invention will be described in detail with reference to the drawings.

LTE (and LTE-A Pro) and NR may be defined as different RATs. The NR may be defined as a technology included in the LTE. The LTE may be defined as a technology included in the NR. In addition, the LTE that is connectable to the NR using Multi RAT Dual connectivity may be distinguished from the existing LTE. The present embodiment may be applied to the NR, the LTE and other RATs. Terms associated with the LTE and the NR are used in the following description. However, the present invention may be applied to other technologies using other terms. In this embodiment, the term "E-UTRA" may be replaced with "LTE," and the term "LTE" may be replaced with "E-UTRA".

Figure 1:
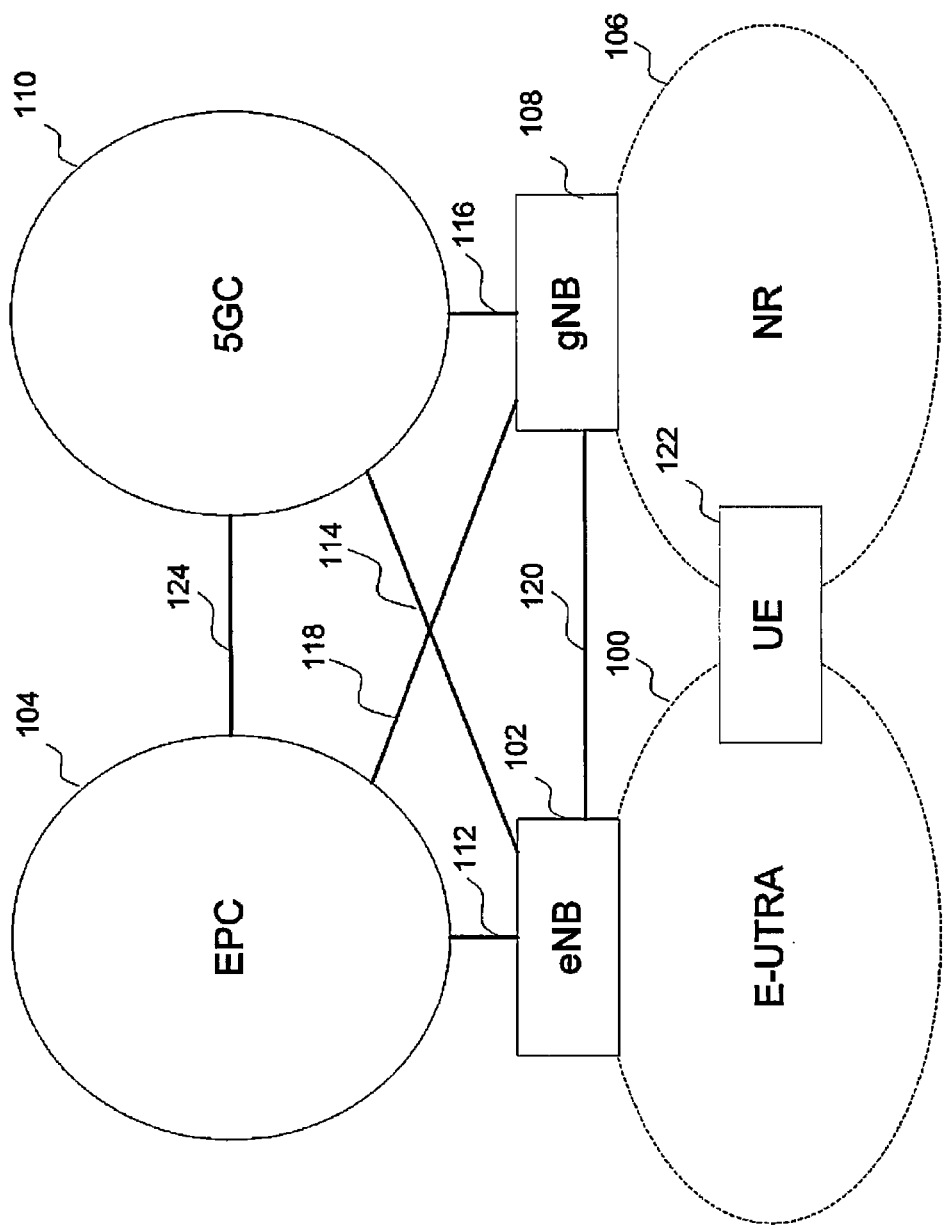
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a Cell Group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

An NR 106 is a radio access technology described in NPL 9 or the like, and includes a Cell Group (CG) including one or multiple frequency bands. A gNode B (gNB) 108 is an NR base station apparatus. A 5GC 110 is a core network described in NPL 2 or the like, and is designed as a core network for NR, but may also be used as a core network for E-UTRA functioning to connect to a 5CG. Hereinafter, the E-UTRA may include an E-UTRA functioning to connect to the 5CG.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces through which the CP only or the UP only is transmitted or both the CP and the UP are transmitted. Furthermore, interface 114, the interface 116, the interface 118, the interface 120, and the interface 124 may not exist depending on communication systems provided by network operators.

A UE 122 is a terminal apparatus supporting the NR or both the E-UTRA and the NR.

Figure 2:
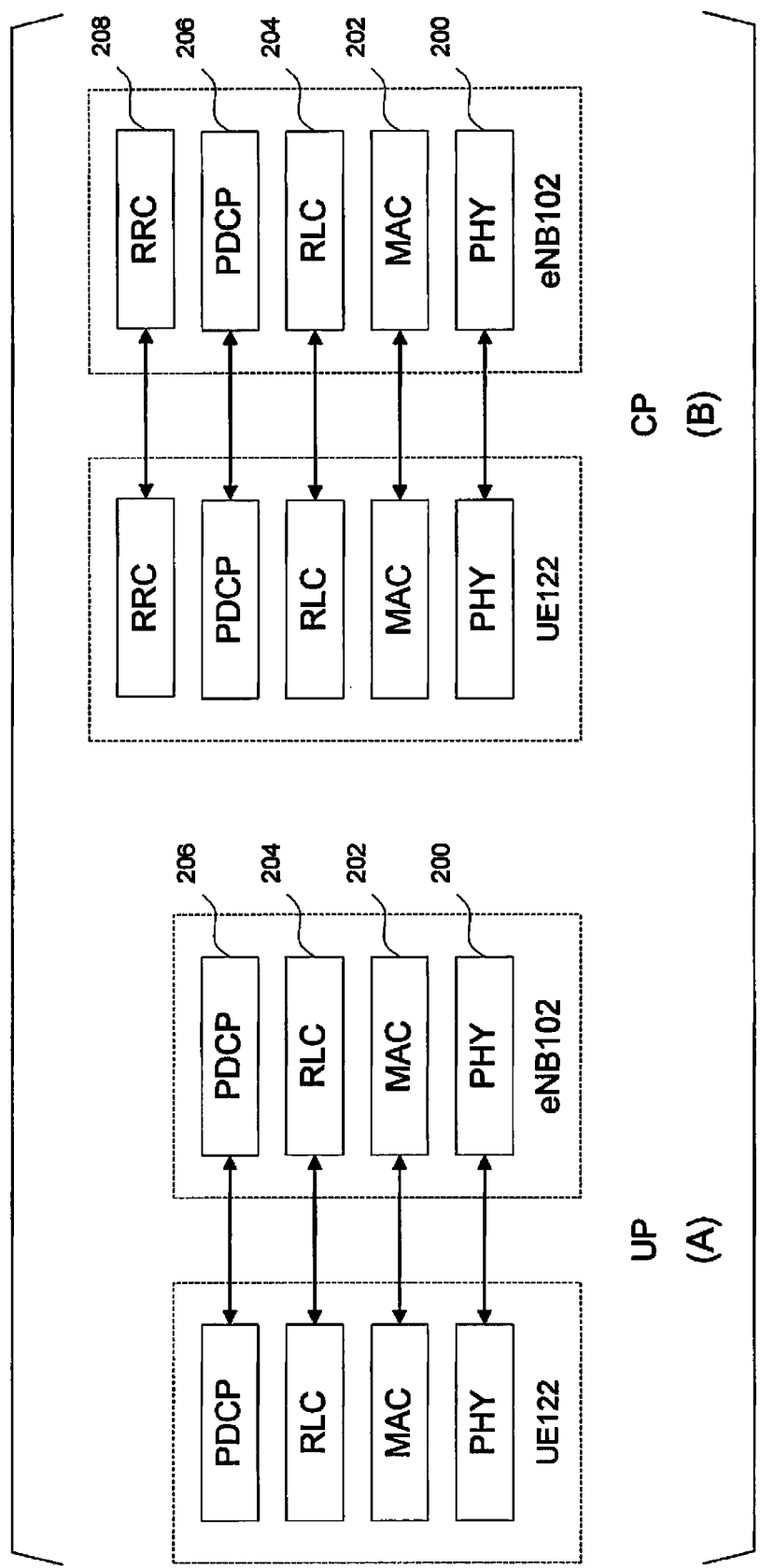
FIG. 2 is a diagram of protocol stacks of a UP and a CP of a terminal apparatus and a base station apparatus in E-UTRA according to each embodiment of the present invention.

FIG. 2 is a diagram of Protocol Stacks of a UP and a CP of a terminal apparatus and a base station apparatus in an E-UTRA radio access layer according to each embodiment of the present invention.

FIG. 2(A) is a diagram of the protocol stack of the UP used in a case that the UE 122 communicates with the eNB 102.

A Physical layer (PHY) 200 is a radio physical layer that provides a transmission service to an upper layer by using a Physical Channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various Logical Channels to various transport channels. The MAC 202 is connected with a Radio Link Control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a Random Access procedure, a function of reporting transmit power information, a function of performing HARQ control, and the like (NPL 7).

An RLC 204 is a radio link control layer that segments data received from a Packet Data Convergence Protocol Layer (PDCP) 206 of an upper layer and described below and that adjusts the size of the data such that a lower layer can properly perform data transmission. Furthermore, the RLC 200 also has a function of ensuring Quality of Service (QoS) required for each piece of data. In other words, the RLC 204 has a function of data retransmission control or the like (NPL 6).

A PDCP 206 is a packet data convergence protocol layer for efficiently transmitting, in a radio segment, IP Packets including user data. The PDCP 206 may include a header compression function of compressing unnecessary control information. Furthermore, the PDCP 206 may also include a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 is a radio link control layer that performs configuration, reconfiguration, and the like of Radio Bearers (RBs) to control logical channels, transport channels, and physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Note that upper layers of the PDCP layer include an IP layer and a Transmission Control Protocol (TCP) layer, a User Datagram Protocol (UDP) layer, an application layer, and the like that are higher than the IP layer (not illustrated). The RRC layer and a non-Access Stratum (NAS) layer are also upper layers of the SDAP layer (not illustrated). In other words, the PDCP layer is a lower layer of the RRC layer, the NAS layer, the IP layer, and the Transmission Control Protocol (TCP) layer, the User Datagram Protocol (UDP) layer, the application layer, and the like, which are higher than the IP layer.

Figure 3:
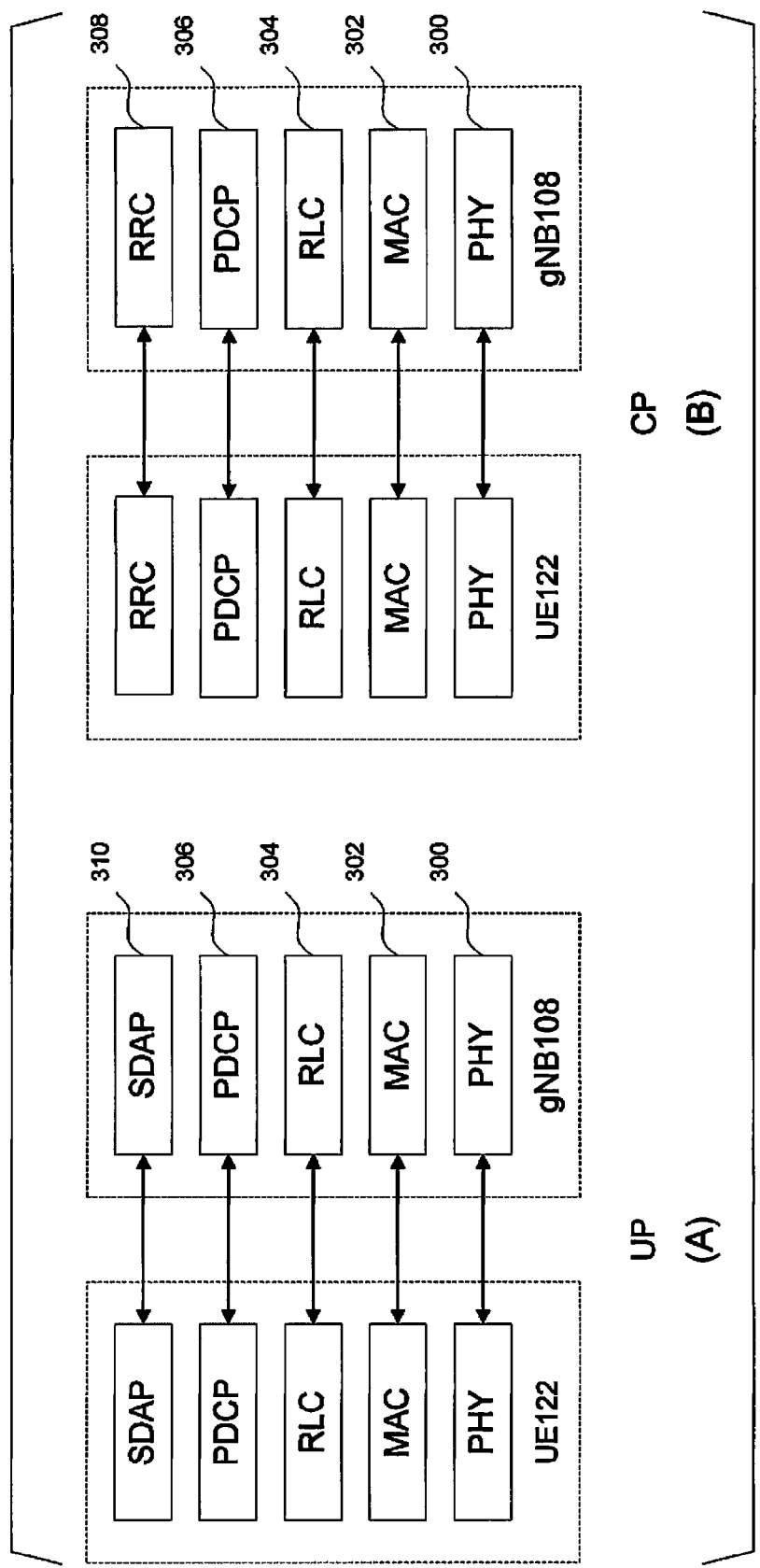
FIG. 3 is a diagram of protocol stacks of the UP and the CP of the terminal apparatus and the base station apparatus in NR according to each embodiment of the present invention.

FIG. 3 is a diagram of Protocol Stacks of a UP and a CP of a terminal apparatus and a base station apparatus in an NR radio access layer according to each embodiment of the present invention.

FIG. 3(A) is a diagram of the protocol stack of the UP used in a case that the UE 122 communicates with the gNB 108.

A Physical layer (PHY) 300 is a radio physical layer of the NR and may provide a transmission service to an upper layer by using the Physical Channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

The MAC 302 is a media access control layer that maps various Logical Channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the Random Access procedure, a function of reporting the transmit power information, a function of performing the HARQ control, and the like (NPL 13).

An RLC 304 is a radio link control layer that segments data received from the Packet Data Convergence Protocol Layer (PDCP) 206 of an upper layer and described below and that adjusts the size of the data to allow a lower layer to properly perform data transmission. Furthermore, the RLC 304 may also have a function of ensuring Quality of Service (QoS) required for each piece of data. In other words, the RLC 304 may have a function of data retransmission control or the like (NPL 12).

A PDCP 306 is a packet data convergence protocol layer that efficiently transmits IP Packets including user data in a radio segment. The PDCP 306 may include a header compression function of compressing unnecessary control information. The PDCP 306 may also include a data encryption function (NPL 11).

A Service Data Adaptation Protocol (SDAP) 310 is a service data adaptation protocol layer that includes a function of mapping the DRB to a downlink QoS flow transmitted from a core network to a terminal apparatus through a base station apparatus, mapping the DRB to an uplink QoS flow transmitted from the terminal apparatus to the core network through the base station apparatus, and storing mapping rule information (NPL 16). In a case that the terminal apparatus receives the SDAP SDU with the QoS flow information from an upper layer, the terminal apparatus allocates the SDAP SDU to the corresponding DRB based on the stored mapping rule between the QoS flow and the DRB. In a case that no mapping rule between the QoS flow and the DRB is stored, the SDAP SDU may be allocated to a default radio bearer (default DRB). The QoS flow includes one or multiple Service Data Flows (SDFs) processed using the same QoS policy (NPL 2). The SDAP may include a Reflective QoS function of mapping the uplink QoS flow to the DRB based on information of the downlink QoS flow. In a case that the association rule between the QoS flow and the DRB is changed, an End Marker DPU may be created and transmitted to the DRB before the change to ensure in-sequence delivery of the SDAP SDU (NPL 2 and NPL 16).

The end marker PDU is an SDAP control PDU described in NPL 16, and is used for an SDAP entity of the UE to indicate termination of mapping between a QoS flow corresponding to a QoS flow identifier included in a QoS flow identifier field of the end marker PDU and the radio bearer in which the present end marker PDU has been transmitted.

Note that the upper layers of the SDAP layer correspond to the IP layer and the Transmission Control Protocol (TCP) layer, the User Datagram Protocol (UDP) layer, the application layer, and the like that are higher than the IP layer (not illustrated). The RRC layer and a non-Access Stratum (NAS) layer are also upper layers of the SDAP layer (not illustrated). In the NAS layer, the service data flow and the QoS flow are mapped to each other. In other words, the SDAP layer is a lower layer of the RRC layer, the NAS layer, the IP layer, and the Transmission Control Protocol (TCP) layer, the User Datagram Protocol (UDP) layer, and the application layer, which are higher than the IP layer.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. The data delivered from upper layers to the MAC 202, the RLC 204, and the PDCP 206 or data delivered to upper layers therefrom may be respectively referred to as a MAC Service Data Unit (SDU), the RLC SDU, the PDCP SDU, and the SDAP SDU.

FIG. 3(B) is a diagram of the protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 is a radio link control layer that performs configuration, reconfiguration, and the like of the Radio Bearers (RBs) to control logical channels, transport channels, and physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 308 of the gNB 108 and the UE 122. A portion of the RB including the RLC 304 and the MAC 302 may be referred to as an RLC bearer (NPL 10).

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that, in each embodiment of the present invention, in order to distinguish an E-UTRA protocol and an NR protocol from each other, the MAC 202, the RLC 204, the PDCP 206, and the RRC 208 may hereinafter be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Embodiment 1

Embodiments of the present invention will be described with reference to FIG. 1 to FIG. 9.

Figure 4:
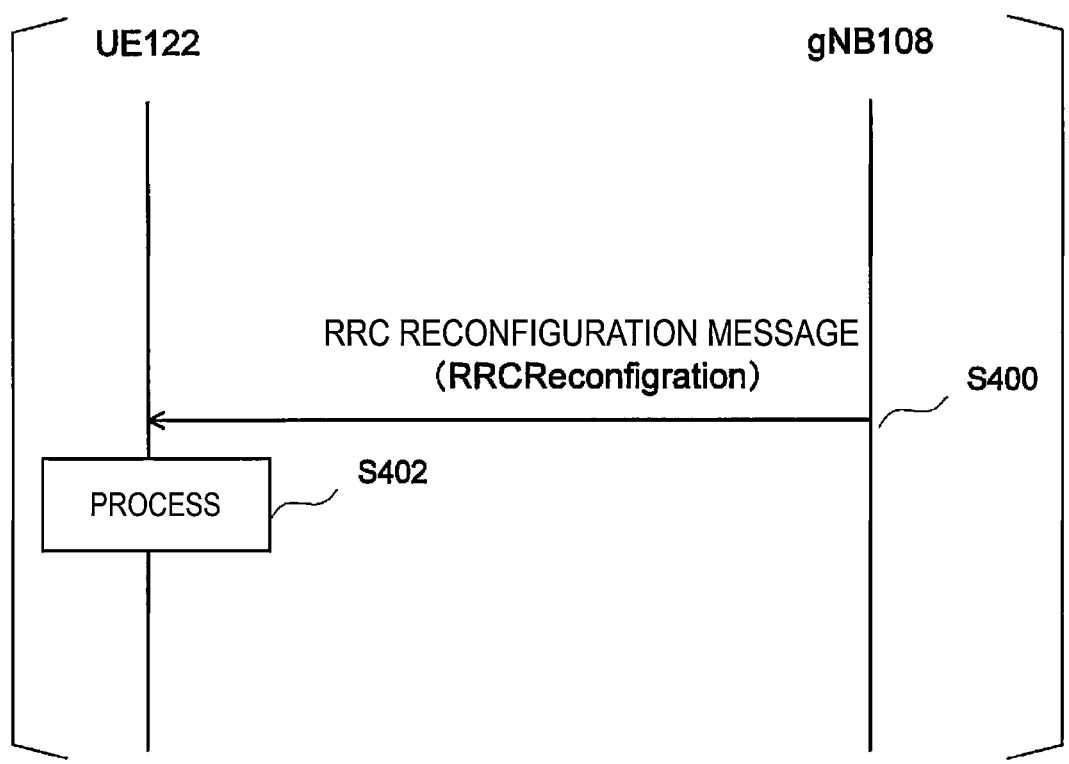
FIG. 4 is a diagram illustrating an example of a flow of an RRC connection reconfiguration procedure according to each embodiment of the present invention.

FIG. 4 is a diagram illustrating an example of a flow of an RRC reconfiguration procedure according to each embodiment of the present invention. Note that the RRC reconfiguration procedure may be an RRC connection reconfiguration procedure.

The RRC Reconfiguration procedure is a procedure used for handover (reconfiguration with synchronization), Measurement, and the like in addition to establishment, change, and release of an RB and change, release, and the like of a secondary cell in NR described in NPL 10. The RRC connection reconfiguration procedure (RRC Connection Reconfiguration) is a procedure used for handover, Measurement, and the like in addition to establishment, change, and release of an RB and change, release, and the like of a secondary cell in LTE described in NPL 4. In MR-DC, particularly in E-UTRA-NR Dual Connectivity (EN-DC) corresponding to the MR-DC in which the core network is the EPC 104 and in which a master node is the eNB 102 (also referred to as the expanded eNB 102) and NG-RAN E-UTRA-NR Dual Connectivity (NGEN-DC) corresponding to the MR-DC in which the core network is the 5GC 110 and in which the master node is the eNB 102, or in a case of the expanded eNB 102 connecting to the core network 5GC, the RRC connection reconfiguration procedure is used to perform a part of handover, Measurement, and the like in addition to a part of establishment, change, and release of a RB and change, release, and the like of a secondary cell in NR described in NPL 10, as well as in LTE. In each embodiment of the present invention, for avoidance of complicated description, the designation "RRC reconfiguration procedure" is used in the description, and the gNB 108 is used as the base station apparatus in the description.

In the RRC reconfiguration procedure, the UE 122 receives an RRC reconfiguration message (RRCReconfiguration) from the gNB 108 (step S400) and performs processing of various configurations, for example, configuration of the radio bearer and configuration of the SDAP in accordance with information included in the RRC reconfiguration message (step S402). After step S402, the UE 122 may transmit an RRC reconfiguration completion message (RRCReconfigrationComplete) to the gNB 108 (not illustrated). Note that the RRC reconfiguration message may be referred to as an RRC reconfiguration, and the RRC reconfiguration complete message may be referred to as an RRC reconfiguration complete.

Figure 5:
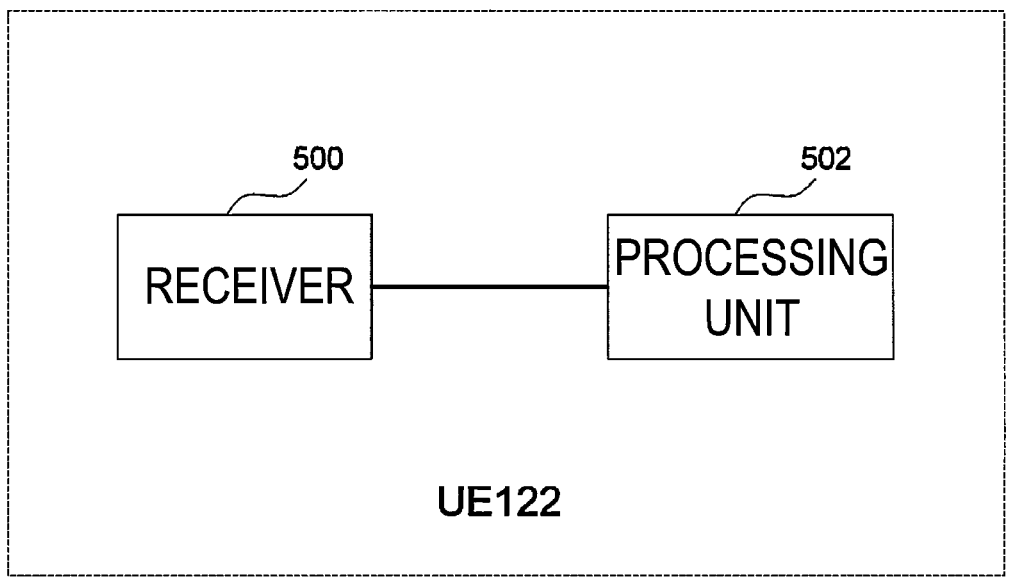
FIG. 5 is a block diagram illustrating a configuration of a terminal apparatus according to each embodiment of the present invention.

FIG. 5 is a block diagram illustrating a configuration of the terminal apparatus (the UE 122) according to each embodiment of the present invention. Note that FIG. 5 illustrates only the main components closely related to the present invention in order to avoid complexity of description.

The UE 122 illustrated in FIG. 5 includes a receiver 500 configured to receive an RRC reconfiguration message from the gNB 108 and a processing unit 502 configured to perform processing in accordance with various Information Elements (IEs), various conditions, and the like included in the message received.

Figure 6:
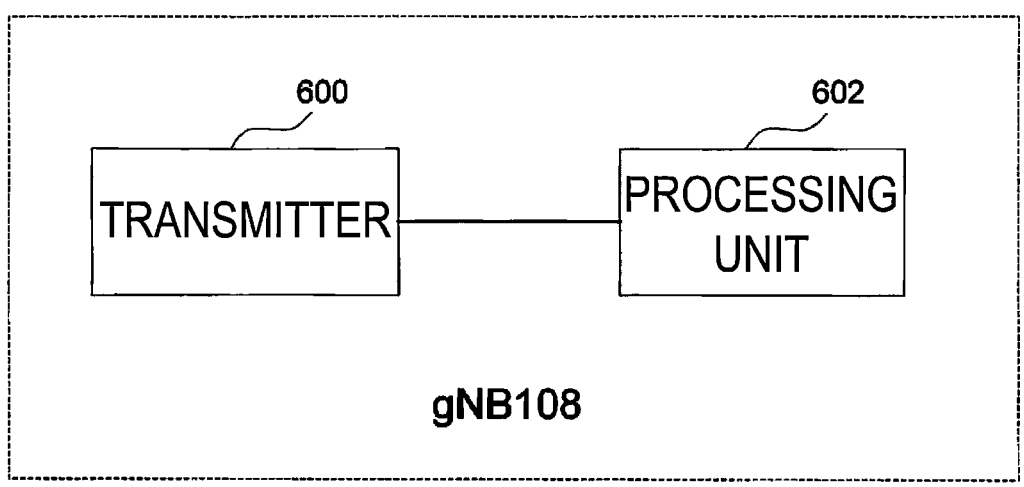
FIG. 6 is a block diagram illustrating a configuration of a base station apparatus according to each embodiment of the present invention.

FIG. 6 is a block diagram illustrating a configuration of the base station apparatus (gNB 108) according to each embodiment of the present invention. Note that FIG. 6 illustrates only the main components closely related to the present invention in order to avoid complexity of description.

The gNB 108 illustrated in FIG. 6 includes a transmitter 600 configured to transmit an RRC reconfiguration message or the like to the UE 122, and a processing unit 602 configured to create and transmit an RRC reconfiguration message including various Information Elements (IEs) to the UE 122 to cause the processing unit 502 of the UE 122 to perform processing. Note that the configuration illustrated in FIG. 6 may be adapted to the eNB 102. In a case that the configuration is adapted to the eNB 102, the message transmitted from the transmitter 600 to the UE 122 may be the RRC connection reconfiguration message.

FIG. 7 is a diagram illustrating an example of an Abstract Syntax Notation One (ASN. 1) description representing information elements included in the RRC reconfiguration message in FIG. 4, in Embodiment 1 of the present invention. In 3GPP, the specifications related to the RRC (NPL 4 and NPL 10) use ASN. 1 to describe messages, Information Elements (IEs), and the like related to the RRC. In the example of ASN. 1 in FIG. 7, <omitted> and <partly omitted> are not part of the notation of ASN. 1 and mean that other information is omitted. Note that information elements may be omitted in portions where neither <omitted> nor <partly omitted> is indicated. Note that the example of ASN. 1 in FIG. 7 does not correctly follow the ASN. 1 notation method but notates an example of parameters for RRC reconfiguration in the present invention and that other designations and other notations may be used. The example of ASN. 1 in FIG. 7 illustrates only the main information closely related to the present invention in order to avoid complexity of description.

In FIG. 7, an information element represented by DRB-ToAddModList or DRBToAddMod may be a list of information indicating a configuration of a DRB (data radio bearer) to be added or changed, and may be referred to as a radio bearer configuration information element or a data radio bearer information element in the embodiment of the present invention.

An information element included in the radio bearer configuration information elements and represented by the DRB-Identity is information regarding the DRB identity of the DRB to be added or changed, and may be referred to as a radio bearer identity information element or a data radio bearer identity information element in the embodiment of the present invention. In the example in FIG. 7, the DRB-Identity is an integer value ranging from 1 to 32, but other values may be taken. For DC, the DRB identity is unique within the scope of the UE 122.

An information element included in the radio bearer configuration information elements and represented by cnAssociation may be an information element indicating whether the EPC 104 or the 5GC 110 is used for the core network and may be referred to as a core network association information element in the embodiment of the present invention. In other words, in a case that the UE 122 connects to the EPC, the DRB may be associated with an EPS bearer identity information element (eps-BearerIdentity) in cnAssociation or an EPS bearer identity corresponding to the value of the EPS bearer identity information element, and in a case that the UE 122 connects to the 5GC 110, the DRB may be associated with an SDAP entity configured in accordance with the SDAP configuration information element (sdap-Config) described below, or a PDU session information element included in the SDAP configuration information element and described below, or a PDU session identifier corresponding to a value of the PDU session information element. In other words, the information element represented by cnAssociation may include the EPS bearer identity information element (eps-BearerIdentity) in a case that the EPC 104 is used for the core network, or include the information element (sdap-Config) indicating the SDAP configuration in a case that the core network 5GC 110 is used.

An information element represented by sdap-Config may be information related to a configuration or reconfiguration of the SDAP entity and determining the method for mapping between the QoS flow and the DRB in a case that the core network is the 5GC 110, and may be referred to as an SDAP configuration information element in the embodiment of the present invention.

An information element included in the SDAP configuration information elements and represented by pdu-session or PDU-SessionID may be the identifier of a PDU session described in NPL 2 and to which a QoS flow mapped to the radio bearer corresponding to the value of a radio bearer identity information element included in the radio bearer configuration information elements including the SDAP configuration information element, and may be referred to as a PDU session information element in the embodiment of the present invention. The value of the PDU session information element may be an integer that is not negative.

An information element included in the SDAP configuration information elements and represented by mappedQoS-FlowsToAdd may be information indicating a list of QoS Flow Identity (QFI) information elements, described below, for a QoS flow mapped to or additionally mapped to the radio bearer corresponding to the value of a radio bearer identity information element included in the radio bearer configuration information elements including the SDAP configuration information element, and may be referred to as an added QoS flow information element in the embodiment of the present invention. The QoS flow described above may be a QoS flow of a PDU session indicated by a PDU session information element included in the SDAP configuration information element.

An information element included in the SDAP configuration information elements and represented by mappedQoS-FlowsToRelease may be information indicating a list of QoS Flow Identity (QFI) information elements described below, for a QoS flow included in the QoS flows mapped to the radio bearer corresponding to the value of a radio bearer identity information element included in the radio bearer configuration information elements including the SDAP configuration information element, the mapping relationship of the QoS flow being to be released, and may be referred to as a released QoS flow information element in the embodiment of the present invention. The QoS flow described above may be a QoS flow of a PDU session indicated by a PDU session information element included in the SDAP configuration information element.

An information element represented by QFI may be a QoS flow identifier uniquely identifying a QoS flow and described in NPL 2, and may be referred to as a QoS flow identifier information element in the embodiment of the present invention. The value of the QoS flow identifier information element may be an integer that is not negative. The value of the QoS flow identifier information element may be unique to the PDU session.

The SDAP configuration information elements may further include an uplink header information element indicating the presence of an uplink header, a downlink header information element indicating the presence of a downlink header, a default bearer information element indicating a default radio bearer (default DRB), and the like.

Information elements included in the radio bearer configuration information elements and represented by pdcp-Config or PDCP-Config may be information related to configuration of an NR PDCP entity for establishing or changing the PDCP 306 for the SRB or the DRB, and may be referred to as a PDCP configuration information element in the embodiment of the present invention. Information related to the configuration of the NR PDCP entity may include information indicating the size of an uplink sequence number, information indicating the size of a downlink sequence number, information indicating a profile for header compression (RObust Header Compression (RoHC)), re-ordering timer information, and the like.

An information element included in the radio bearer configuration information elements and represented by DRB-ToReleaseList may be list information of the DRB identities of DRBs to be released, and may be referred to as a released radio bearer information element or a released data radio bearer information element in the embodiment of the present invention.

Some or all of the information elements illustrated in FIG. 7 may be optional. In other words, the information elements illustrated in FIG. 7 may be included in the RRC reconfiguration message when necessary.

Figure 8:
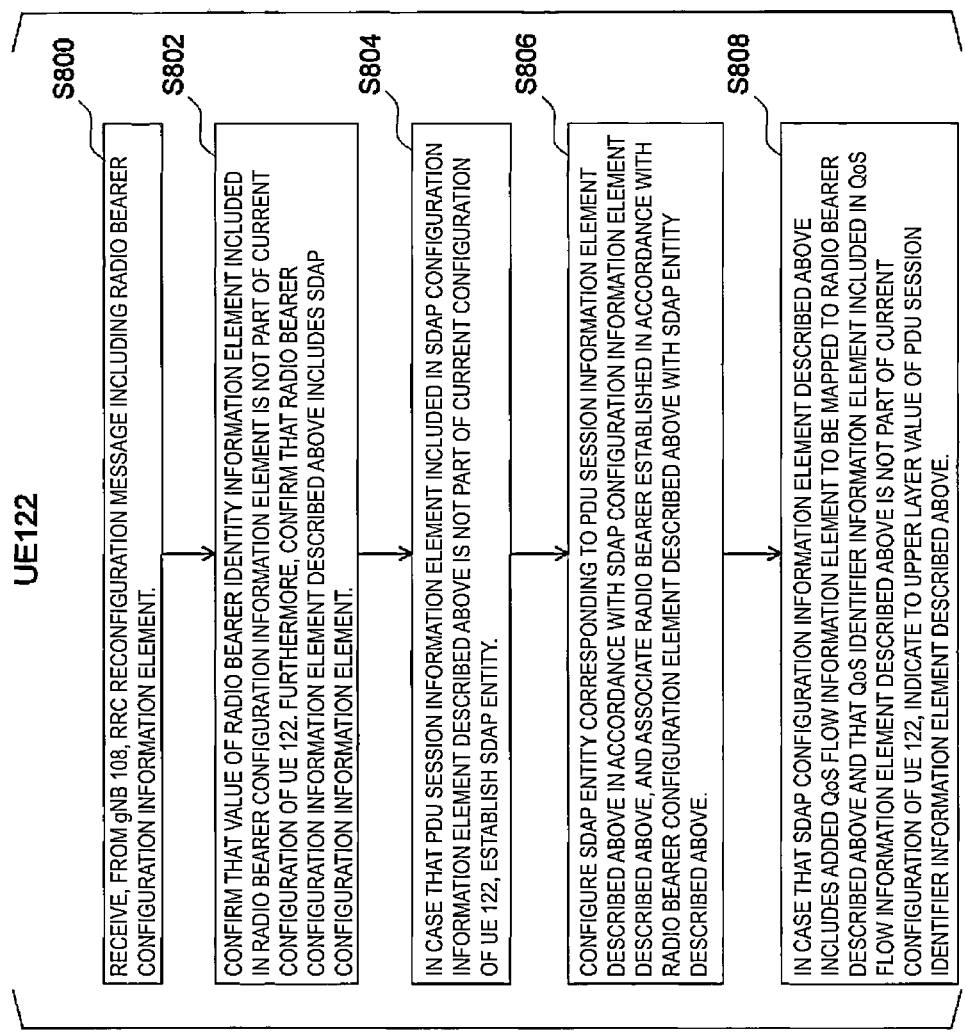
FIG. 8 is an example of a processing method according to Embodiment 1 of the present invention.

An example of a processing method for the UE 122 in Embodiment 1 of the present invention will be described by using FIG. 8.

The processing unit 602 of the gNB 108 creates an RRC reconfiguration message including a radio bearer configuration information element for causing the UE 122 to perform processing, and the transmitter 600 transmits the RRC reconfiguration message to the UE 122 (not illustrated). The receiver 500 of the UE 122 receives the RRC reconfiguration message from the gNB 108 (step S800). Note that the UE 122 may receive the RRC message including the radio bearer configuration information element described above from the eNB 102, and the RRC message in this case may be referred to as an RRC connection re-establishment message.

Then, the processing unit 502 of the UE 122 confirms that the value of the radio bearer identity information element included in the radio bearer configuration information element described above is not part of the current configuration of the UE 122. The processing unit 502 further confirms that the radio bearer configuration information element described above includes an SDAP configuration information element (step S802).

In a case of confirming, in step 802, that the value of the radio bearer identity information element included in the radio bearer configuration information element described above is not part of the current configuration of the UE 122 and that the radio bearer configuration information element described above includes the SDAP configuration information element, the processing unit 502 of the UE 122 then checks whether or not a PDU session information element included in the SDAP configuration information element described above or the value of the PDU session information element is part of the current configuration of the UE 122, and in a case that the PDU session information element or the value thereof is not part of the current configuration, determines that the SDAP entity for the PDU session indicated by the PDU session information element described above is not established, and establishes the SDAP entity (step S804). In a case that the PDU session information element described above or the value of the PDU session information element is part of the current configuration of the UE 122, the processing unit 502 determines that the SDAP entity for the PDU session indicated by the PDU session information element described above is already established and does not establish the SDAP entity.

Then, the processing unit 502 of the UE 122 configures the SDAP entity corresponding to the PDU session information element described above in accordance with the SDAP configuration information element described above, and further associates, with the SDAP entity described above, the radio bearer established in accordance with the radio bearer configuration element described above (step S806).

Then, the processing unit 502 of the UE 122 checks whether the SDAP configuration information element described above includes an added QoS flow information element to be mapped to the radio bearer described above, that is, the radio bearer corresponding to the value of the radio bearer identity information element described above. In a case that the SDAP configuration information element includes the added QoS flow information element and that the QoS identifier information element included in the added QoS flow information element described above includes a QoS flow identifier information element not part of the current configuration of the UE 122 or the value of the QoS flow identifier information element, the processing unit 502 indicates to the upper layer that "user-plane resources have been established for the PDU session corresponding to the PDU session information element described above." "User plane resources have been established for the PDU session corresponding to the PDU session information element described above" may be referred to as "a mapping rule is stored that relates to the mapping between the radio bearer and the QoS flow corresponding to the QoS flow identifier information element not part of the current configuration of the UE 122 described above or the value of the QoS flow identifier information element".

Indicating that "user-plane resources have been established for the PDU session corresponding to the PDU session information element described above" may be, for example, indicating to the upper layer the PDU session identifier information element described above or the value of the PDU session identifier information element. At this time, the new QoS flow identifier information element described above or the value of the new information element may be simultaneously indicated to the upper layer, or indicating to the upper layer the PDU session identifier information element described above or the value of the PDU session identifier information element described above may be replaced with indicating to the upper layer the new QoS flow identifier information element described above or the value of the new information element (step S808).

In a case that the SDAP configuration information element described above includes no added QoS flow information element, indicating to the upper layer that "user-plane resources have been established for the PDU session corresponding to the PDU session information element described above" is omitted. Even in a case that the SDAP configuration information element described above includes an added QoS flow information element, in a case that all of the QoS identifier information elements included in the QoS flow information element described above or the values of all of the QoS identifier information elements are part of the current configuration of the UE 122, indicating to the upper layer that "user-plane resources have been established for the PDU session corresponding to the PDU session information element described above" is omitted in a case that the SDAP configuration information element described above includes no added QoS flow information element.

Note that, in step S808, "in a case that the QoS identifier information element included in the QoS flow information element described above includes a QoS flow identifier information element not part of the current configuration of the UE 122 or the value of the QoS flow identifier information element" may be referred to as "in a case that the QoS identifier information element included in the QoS flow information element described above includes a new QoS flow identifier information element or the value of the new QoS flow identifier information element."

Figure 9:
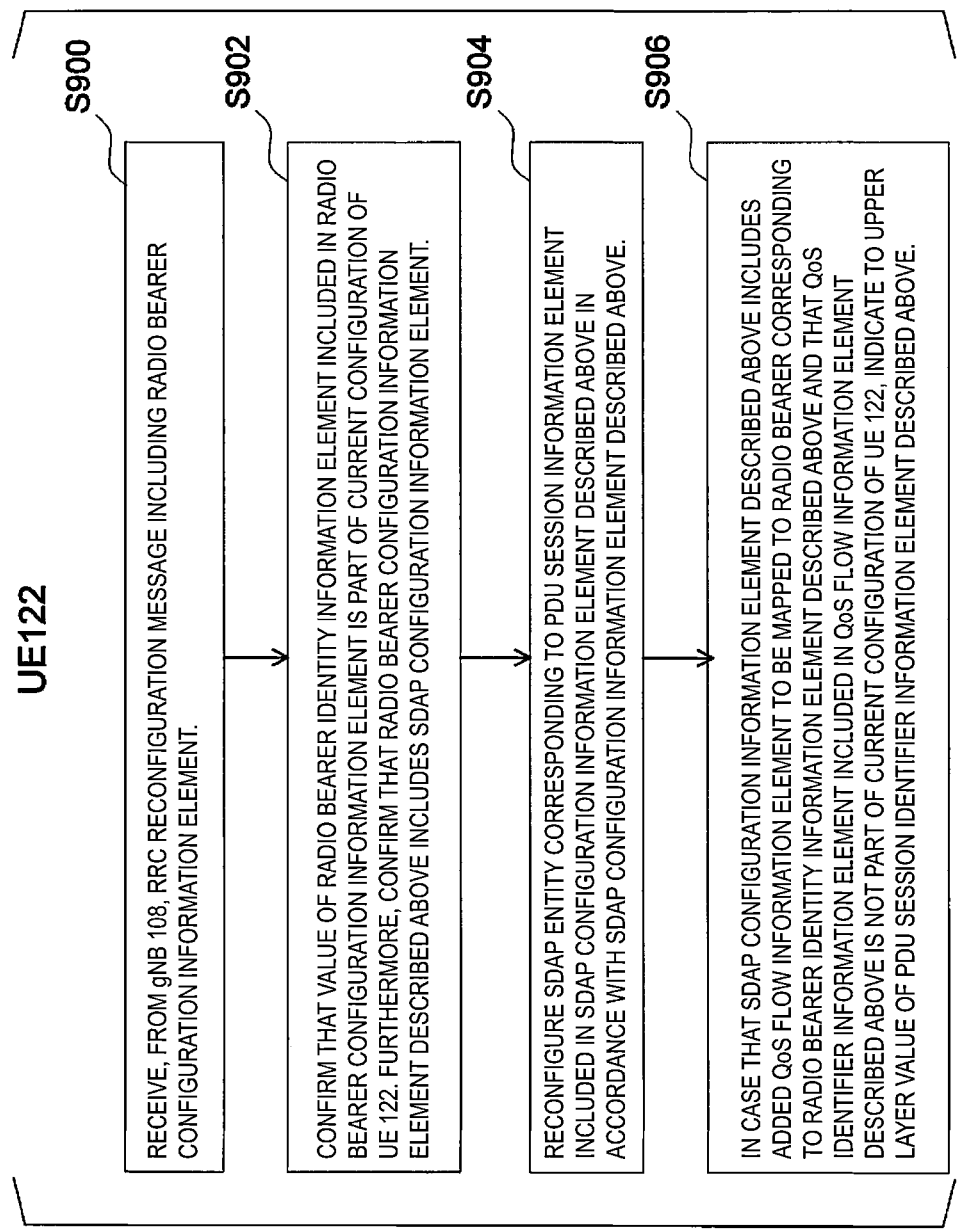
FIG. 9 is another example of the processing method according to Embodiment 1 of the present invention.

Another example of the processing method for the UE 122 according to the embodiment of the present invention will be described by using FIG. 9.

The processing unit 602 of the gNB 108 creates an RRC reconfiguration message including a radio bearer configuration information element for causing the UE 122 to perform processing, and the transmitter 600 transmits the RRC reconfiguration message to the UE 122 (not illustrated). The receiver 500 of the UE 122 receives the RRC reconfiguration message from the gNB 108 (step S900). Note that the UE 122 may receive the RRC message including the radio bearer configuration information element described above from the eNB 102, and the RRC message in this case may be referred to as an RRC connection re-establishment message.

Then, the processing unit 502 of the UE 122 confirms that the value of the radio bearer identity information element included in the radio bearer configuration information element described above is part of the current configuration of the UE 122. The processing unit 502 further confirms that the radio bearer configuration information element described above includes an SDAP configuration information element (step S902).

In a case of confirming, in step 902, that the value of the radio bearer identity information element included in the radio bearer configuration information element described above is part of the current configuration of the UE 122 and that the radio bearer configuration information element described above includes an SDAP configuration information element, the processing unit 502 of the UE 122 then configures or reconfigures, in accordance with the SDAP configuration information element described above, the SDAP entity corresponding to the PDU session information element included in the SDAP configuration information element described above (step S904).

Then, the processing unit 502 of the UE 122 checks whether the SDAP configuration information element described above includes an added QoS flow information element to be mapped to the radio bearer described above, that is, the radio bearer corresponding to the value of the radio bearer identity information element described above. In a case that the SDAP configuration information element includes the added QoS flow information element and that the QoS identifier information element included in the added QoS flow information element described above includes a QoS flow identifier information element not part of the current configuration of the UE 122 or the value of the QoS flow identifier information element, the processing unit 502 indicates to the upper layer that "user-plane resources have been established for the PDU session corresponding to the PDU session information element described above." "User plane resources have been established for the PDU session corresponding to the PDU session information element described above" may be referred to as "a mapping rule is stored that relates to the mapping between the radio bearer and the QoS flow corresponding to the QoS flow identifier information element not part of the current configuration of the UE 122 described above or the value of the QoS flow identifier information element".

Indicating that "user-plane resources have been established for the PDU session corresponding to the PDU session information element described above" may be, for example, indicating to the upper layer the PDU session identifier information element described above or the value of the PDU session identifier information element. At this time, the new QoS flow identifier information element described above or the value of the new information element may be simultaneously indicated to the upper layer, or indicating to the upper layer the PDU session identifier information element described above or the value of the PDU session identifier information element described above may be replaced with indicating to the upper layer the new QoS flow identifier information element described above or the value of the new information element (step S906).

In a case that the SDAP configuration information element described above includes no added QoS flow information element, indicating to the upper layer that "user-plane resources have been established for the PDU session corresponding to the PDU session information element described above" is omitted. Even in a case that the SDAP configuration information element described above includes an added QoS flow information element, in a case that all of the QoS identifier information elements included in the added QoS flow information element described above or the values of all of the QoS identifier information elements are part of the current configuration of the UE 122, indicating to the upper layer that "user-plane resources have been established for the PDU session corresponding to the PDU session information element described above" is omitted in a case that the SDAP configuration information element described above includes no added QoS flow information element.

Note that, in step S906, "in a case that the QoS identifier information element included in the QoS flow information element described above includes a QoS flow identifier information element not part of the current configuration of the UE 122 or the value of the QoS flow identifier information element" may be referred to as "in a case that the QoS identifier information element included in the QoS flow information element described above includes a new QoS flow identifier information element or the value of the new QoS flow identifier information element."

Note that the processing in step S808 or step S906 may be performed by the RRC 308 or RRC 208, or may be performed by the SDAP 310. In the processing in step S808 or step S906, the upper layer may be an NAS layer. The indication to the upper layer in the processing in step S808 or step S906 may be performed after the RRC 308 or RRC 208 confirms the storage, in the SDAP 310, of the mapping rule for the mapping between the radio bearer and the QoS flow corresponding to the QoS flow identifier information element not part of the current configuration of the UE 122 or the value of the QoS flow identifier information element, the information element or value being included in the radio bearer configuration information element described above. A method for confirming the storage of the mapping rule described above may be an indication, from the SDAP 310 to the RRC 308 or RRC 208, of the storage of the mapping rule.

As described above, in Embodiment 1 of the present invention, in a case that the QoS flow not part of the current configuration of the UE 122 is mapped to the DRB, indicating this to the upper layer allows the upper layer to detect that user-plane resources have been established for the PDU session in the lower layer and to transmit user data at the optimal timing. In other words, the terminal apparatus can reduce complexity of protocol processing to enable efficient communication.

Embodiment 2

Embodiment 2 of the present invention will be described by using FIG. 1 to FIG. 7, FIG. 10, and FIG. 11. In Embodiment 2 of the present invention, establishment of user-plane resources for the PDU session is indicated to the upper layer based on the mapping between the established radio bearer and the SDAP entity. Unlike in Embodiment 1, the determination based on the QoS flow identifier information element included in the added QoS flow information element may or may not be performed.

FIG. 4 is a diagram illustrating an example of a flow of an RRC reconfiguration procedure according to each embodiment of the present invention. Note that the RRC reconfiguration procedure may be an RRC connection reconfiguration procedure.

The RRC Reconfiguration procedure is a procedure used for handover (reconfiguration with synchronization), Measurement, and the like in addition to establishment, change, and release of an RB and change, release, and the like of a secondary cell in NR described in NPL 10. The RRC connection reconfiguration procedure (RRC Connection Reconfiguration) is a procedure used for handover, Measurement, and the like in addition to establishment, change, and release of an RB and change, release, and the like of a secondary cell in LTE described in NPL 4. In MR-DC, particularly in E-UTRA-NR Dual Connectivity (EN-DC) corresponding to the MR-DC in which the core network is the EPC 104 and in which a master node is the eNB 102 (also referred to as the expanded eNB 102) and NG-RAN E-UTRA-NR Dual Connectivity (NGEN-DC) corresponding to the MR-DC in which the core network is the 5GC 110 and in which the master node is the eNB 102, or in a case of the expanded eNB 102 connecting to the core network 5GC, the RRC connection reconfiguration procedure is used to perform a part of handover, Measurement, and the like in addition to a part of establishment, change, and release of a RB and change, release, and the like of a secondary cell in NR described in NPL 10, as well as in LTE. In each embodiment of the present invention, for avoidance of complicated description, the designation "RRC reconfiguration procedure" is used in the description, and the gNB 108 is used as the base station apparatus in the description.

In the RRC reconfiguration procedure, the UE 122 receives an RRC reconfiguration message (RRCReconfiguration) from the gNB 108 (step S400) and performs processing of various configurations, for example, configuration of the radio bearer and configuration of the SDAP in accordance with information included in the RRC reconfiguration message (step S402). After step S402, the UE 122 may transmit an RRC reconfiguration completion message (RRCReconfigrationComplete) to the gNB 108 (not illustrated). Note that the RRC reconfiguration message may be referred to as an RRC reconfiguration, and the RRC reconfiguration complete message may be referred to as an RRC reconfiguration complete.

FIG. 5 is a block diagram illustrating a configuration of the terminal apparatus (the UE 122) according to each embodiment of the present invention. Note that FIG. 5 illustrates only the main components closely related to the present invention in order to avoid complexity of description.

The UE 122 illustrated in FIG. 5 includes a receiver 500 configured to receive an RRC reconfiguration message from the gNB 108 and a processing unit 502 configured to perform processing in accordance with various Information Elements (IEs), various conditions, and the like included in the message received.

FIG. 6 is a block diagram illustrating a configuration of the base station apparatus (gNB 108) according to each embodiment of the present invention. Note that FIG. 6 illustrates only the main components closely related to the present invention in order to avoid complexity of description.

The gNB 108 illustrated in FIG. 6 includes a transmitter 600 configured to transmit an RRC reconfiguration message or the like to the UE 122, and a processing unit 602 configured to create and transmit an RRC reconfiguration message including various Information Elements (IEs) to the UE 122 to cause the processing unit 502 of the UE 122 to perform processing. Note that the configuration illustrated in FIG. 6 may be adapted to the eNB 102. In a case that the configuration is adapted to the eNB 102, the message transmitted from the transmitter 600 to the UE 122 may be the RRC connection reconfiguration message.

FIG. 7 is a diagram illustrating an example of an Abstract Syntax Notation One (ASN. 1) description representing information elements included in the RRC reconfiguration message in FIG. 4, in Embodiment 1 of the present invention. In 3GPP, the specifications related to the RRC (NPL 4 and NPL 10) use ASN. 1 to describe messages, Information Elements (IEs), and the like related to the RRC. In the example of ASN. 1 in FIG. 7, <omitted> and <partly omitted> are not part of the notation of ASN. 1 and mean that other information is omitted. Note that information elements may be omitted in portions where neither <omitted> nor <partly omitted> is indicated. Note that the example of ASN. 1 in FIG. 7 does not correctly follow the ASN. 1 notation method but notates an example of parameters for RRC reconfiguration in the present invention and that other designations and other notations may be used. The example of ASN. 1 in FIG. 7 illustrates only the main information closely related to the present invention in order to avoid complexity of description.

In FIG. 7, an information element represented by DRB-ToAddModList or DRBToAddMod may be a list of information indicating a configuration of a DRB (data radio bearer) to be added or changed, and may be referred to as a radio bearer configuration information element or a data radio bearer information element in the embodiment of the present invention.

An information element included in the radio bearer configuration information elements and represented by the DRB-Identity is information regarding the DRB identity of the DRB to be added or changed, and may be referred to as a radio bearer identity information element or a data radio bearer identity information element in the embodiment of the present invention. In the example in FIG. 7, the DRB-Identity is an integer value ranging from 1 to 32, but other values may be taken. For DC, the DRB identity is unique within the scope of the UE 122.

An information element included in the radio bearer configuration information elements and represented by cnAssociation may be an information element indicating whether the EPC 104 or the 5GC 110 is used for the core network and may be referred to as a core network association information element in the embodiment of the present invention. In other words, in a case that the UE 122 connects to the EPC, the DRB may be associated with the EPS bearer identity information element (eps-BearerIdentity) in cnAssociation or the EPS bearer identity corresponding to the value of the EPS bearer identity information element, and in a case that the UE 122 connects to the 5GC 110, the DRB may be associated with an SDAP entity configured in accordance with the SDAP configuration information element (sdap-Config) described below, or a PDU session information element included in the SDAP configuration information element and described below, or a PDU session identifier corresponding to a value of the PDU session information element. In other words, the information represented by cnAssociation may include the EPS bearer identity information element (eps-BearerIdentity) in a case that the EPC 104 is used for the core network such as a case that the EN-DC is used or the like, or include the information element (sdap-Config) indicating the SDAP configuration in a case that the core network 5GC 110 is used, that is, in a case that the EN-DC is not used or the like.

An information element represented by sdap-Config may be information related to a configuration or reconfiguration of the SDAP entity and determining the method for mapping between the QoS flow and the DRB in a case that the core network is the 5GC 110, and may be referred to as an SDAP configuration information element in the embodiment of the present invention.

An information element included in the SDAP configuration information elements and represented by pdu-session or PDU-SessionID may be the identifier of a PDU session described in NPL 2 and to which a QoS flow mapped to the radio bearer corresponding to the value of a radio bearer identity information element included in the radio bearer configuration information elements including the SDAP configuration information element, and may be referred to as a PDU session information element in the embodiment of the present invention. The value of the PDU session information element may be an integer that is not negative.

An information element included in the SDAP configuration information elements and represented by mappedQoS-FlowsToAdd may be information indicating a list of QoS Flow Identity (QFI) information elements, described below, for a QoS flow mapped to or additionally mapped to the radio bearer corresponding to the value of a radio bearer identity information element included in the radio bearer configuration information elements including the SDAP configuration information element, and may be referred to as an added QoS flow information element in the embodiment of the present invention. The QoS flow described above may be a QoS flow of a PDU session indicated by a PDU session information element included in the SDAP configuration information element.

An information element included in the SDAP configuration information elements and represented by mappedQoS-FlowsToRelease may be information indicating a list of QoS Flow Identity (QFI) information elements described below, for a QoS flow included in the QoS flows mapped to the radio bearer corresponding to the value of a radio bearer identity information element included in the radio bearer configuration information elements including the SDAP configuration information element, the mapping relationship of the QoS flow being to be released, and may be referred to as a released QoS flow information element in the embodiment of the present invention. The QoS flow described above may be a QoS flow of a PDU session indicated by a PDU session information element included in the SDAP configuration information element.

An information element represented by QFI may be a QoS flow identifier uniquely identifying a QoS flow and described in NPL 2, and may be referred to as a QoS flow identifier information element in the embodiment of the present invention. The value of the QoS flow identifier information element may be an integer that is not negative. The value of the QoS flow identifier information element may be unique to the PDU session.

The SDAP configuration information elements may further include an uplink header information element indicating the presence of an uplink header, a downlink header information element indicating the presence of a downlink header, a default bearer information element indicating a default radio bearer (default DRB), and the like.

Information elements included in the radio bearer configuration information elements and represented by pdcp-Config or PDCP-Config may be information related to configuration of an NR PDCP entity for establishing or changing the PDCP 306 for the SRB or the DRB, and may be referred to as a PDCP configuration information element in the embodiment of the present invention. Information related to the configuration of the NR PDCP entity may include information indicating the size of an uplink sequence number, information indicating the size of a downlink sequence number, information indicating a profile for header compression (RObust Header Compression (RoHC)), re-ordering timer information, and the like.

An information element included in the radio bearer configuration information elements and represented by DRB-ToReleaseList may be list information of the DRB identities of DRBs to be released, and may be referred to as a released radio bearer information element or a released data radio bearer information element in the embodiment of the present invention.

Some or all of the information elements illustrated in FIG. 7 may be optional. In other words, the information elements illustrated in FIG. 7 may be included in the RRC reconfiguration message when necessary.

Figure 10:
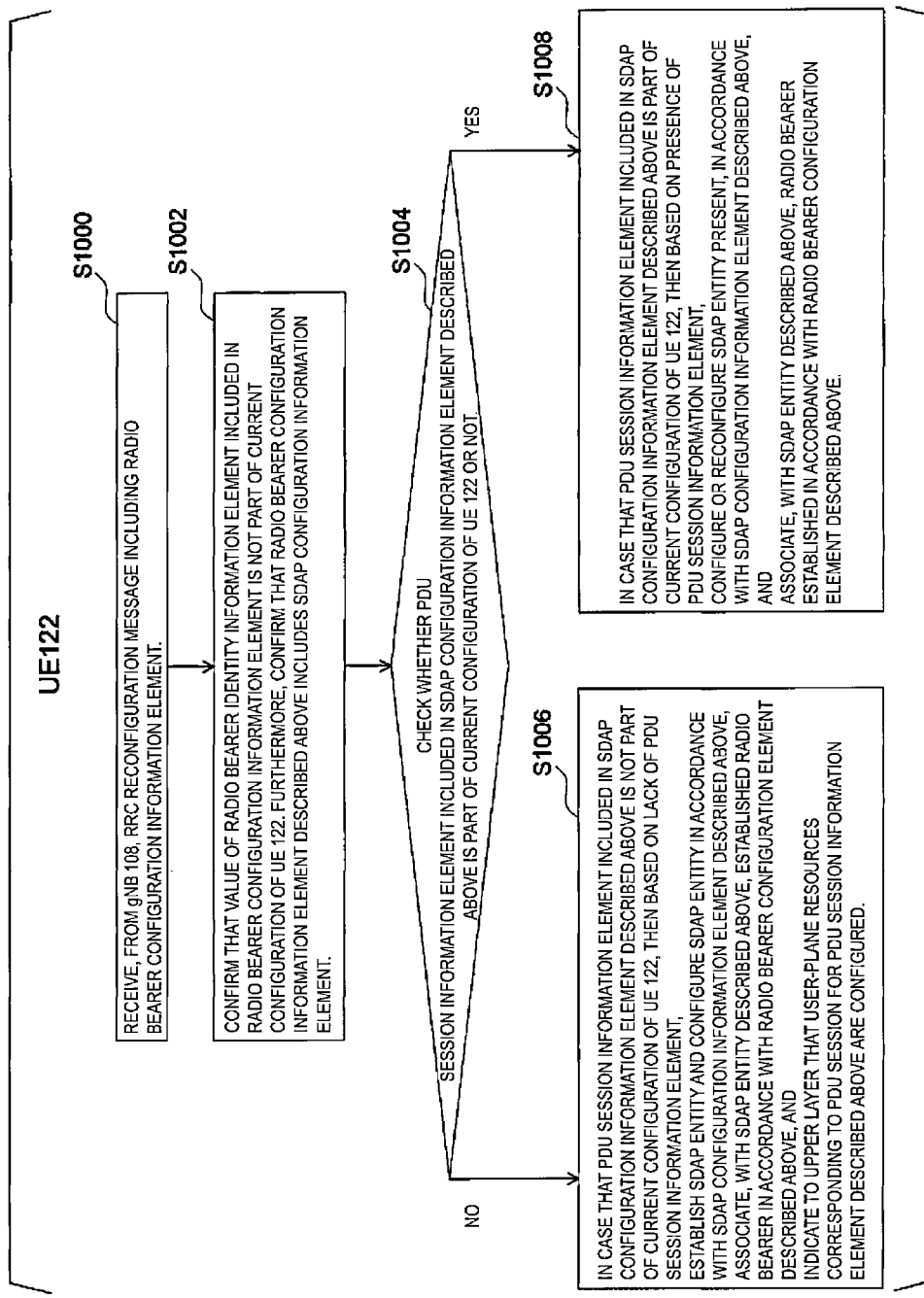
FIG. 10 illustrates an example of the processing method according to Embodiment 1 of the present invention.

An example of a processing method for the UE 122 in Embodiment 2 of the present invention will be described by using FIG. 10.

The processing unit 602 of the gNB 108 creates an RRC reconfiguration message including a radio bearer configuration information element for causing the UE 122 to perform processing, and the transmitter 600 transmits the RRC reconfiguration message to the UE 122 (not illustrated). The receiver 500 of the UE 122 receives the RRC reconfiguration message from the gNB 108 (step S1000). Note that the UE 122 may receive the RRC message including the radio bearer configuration information element described above from the eNB 102, and the RRC message in this case may be referred to as an RRC connection re-establishment message.

Then, the processing unit 502 of the UE 122 confirms that the value of the radio bearer identity information element included in the radio bearer configuration information element described above is not part of the current configuration of the UE 122. Furthermore, the processing unit 502 confirms that the radio bearer configuration information element described above includes an SDAP configuration information element (step S1002).

Based, in step S1002, on the value of the radio bearer identity information element included in the radio bearer configuration information element described above is not part of the current configuration of the UE 122, and an SDAP configuration information element in the radio bearer configuration information element described above is included, the processing unit 502 of the UE 122 then checks whether or not the PDU session information element included in the SDAP configuration information element described above or the value of the PDU session information element is part of the current configuration of the UE 122 (step S1004).

In a case that the PDU session information element included in the SDAP configuration information element described above or the value of the PDU session information element is not part of the current configuration of the UE 122, the processing unit 502 determines, based on the lack of the information element or value, that no SDAP entity is established for the PDU session indicated by the PDU session information element described above, and establishes an SDAP entity. Furthermore, the processing unit 502 of the UE 122 configures the SDAP entity in accordance with the SDAP configuration information element described above, and associates, with the SDAP entity described above, the radio bearer established in accordance with the radio bearer configuration element described above. Furthermore, the processing unit 502 of the UE 122 indicates to the upper layers that "user-plane resources have been established or configured for the PDU session corresponding to the PDU session information element described above." "User plane resources have been established or configured for the PDU session corresponding to the PDU session information element described above" may be referred to as "a mapping rule is stored that relates to the mapping between the radio bearer and the QoS flow corresponding to the QoS flow identifier information element included in the added QoS flow information element included in the SDAP configuration information element described above or the value of the QoS flow identifier information element."

Indicating that "user-plane resources have been established or configured for the PDU session corresponding to the PDU session information element described above" may be, for example, indicating to the upper layer the PDU session identifier information element described above or the value of the PDU session identifier information element. At this time, the QoS flow identifier information element described above or the value of the QoS flow identifier information element may be simultaneously indicated to the upper layer, or indicating to the upper layer the PDU session identifier information element described above or the value of the PDU session identifier information element described above may be replaced with indicating to the upper layer the QoS flow identifier information element described above or the value of the QoS identifier information element (step S1006).

In step S1004, whether the PDU session information element included in the SDAP configuration information element described above or the value of the PDU session information element is part of the current configuration of the UE 122 is checked, and in a case that the information element or value is present, the SDAP entity need not be established based on the presence of the information element or value. In this case, the existing SDAP entity is established or re-established in accordance with the SDAP configuration information element described above, and the radio bearer established in accordance with the radio bearer configuration element described above is associated with the SDAP entity described above (step S1008).

Figure 11:
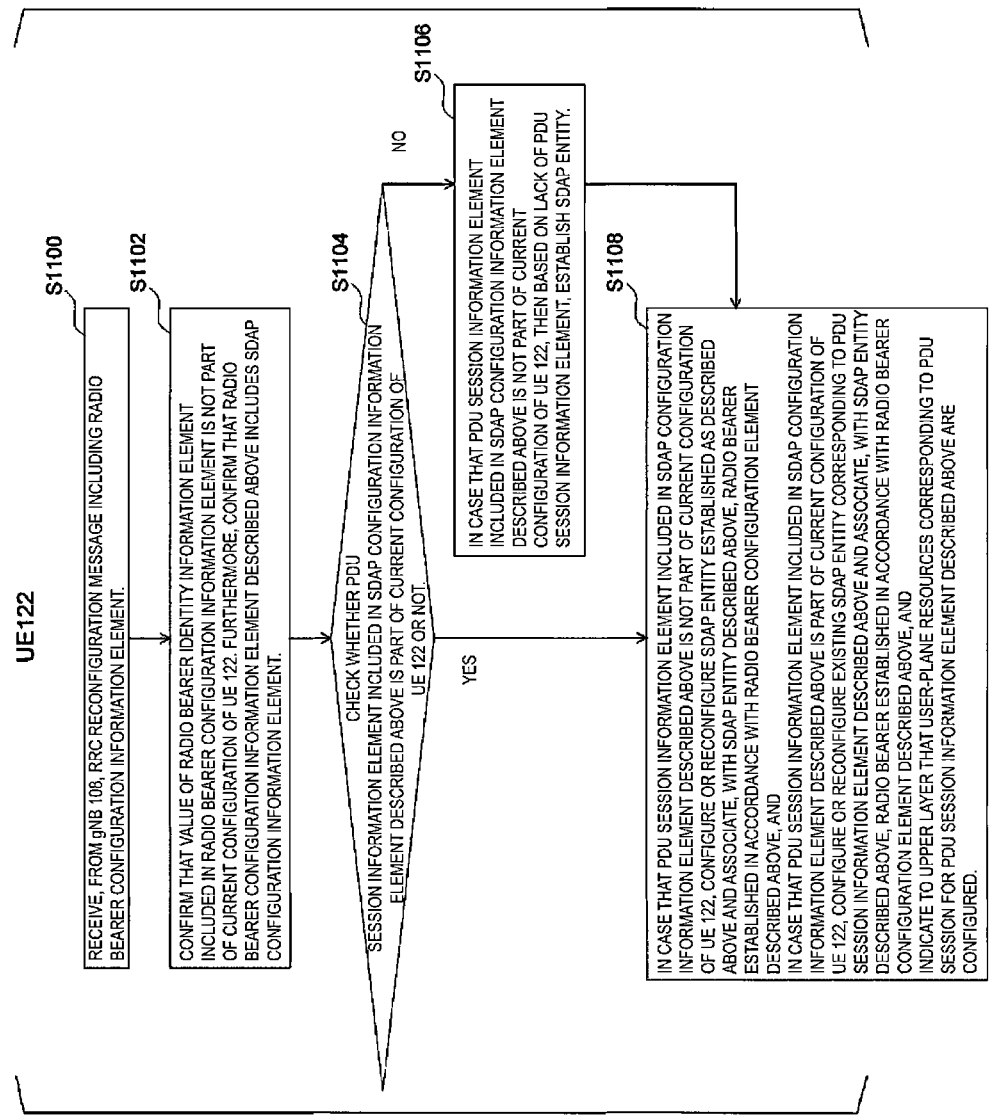
FIG. 11 is another example of the processing method according to Embodiment 1 of the present invention.

Now, another example of the processing method for the UE 122 in Embodiment 2 of the present invention will be described by using FIG. 11.

The processing unit 602 of the gNB 108 creates an RRC reconfiguration message including a radio bearer configuration information element for causing the UE 122 to perform processing, and the transmitter 600 transmits the RRC reconfiguration message to the UE 122 (not illustrated). The receiver 500 of the UE 122 receives the RRC reconfiguration message from the gNB 108 (step S1100). Note that the UE 122 may receive the RRC message including the radio bearer configuration information element described above from the eNB 102, and the RRC message in this case may be referred to as an RRC connection re-establishment message.

Then, the processing unit 502 of the UE 122 confirms that the value of the radio bearer identity information element included in the radio bearer configuration information element described above is not part of the current configuration of the UE 122. The processing unit 502 further confirms that the radio bearer configuration information element described above includes an SDAP configuration information element (step S1102).

Based, in step S1102, on the lack, in the current configuration of the UE 122, of the value of the radio bearer identity information element included in the radio bearer configuration information element described above and the inclusion of an SDAP configuration information element in the radio bearer configuration information element described above, the processing unit 502 of the UE 122 then checks whether or not the PDU session information element included in the SDAP configuration information element described above or the value of the PDU session information element is part of the current configuration of the UE 122 (step S1104).

In a case that the PDU session information element included in the SDAP configuration information element described above or the value of the PDU session information element is not part of the current configuration of the UE 122, the processing unit 502 determines, based on the lack of the information element or value, that no SDAP entity is established for the PDU session indicated by the PDU session information element described above, and establishes an SDAP entity. In a case that the information element or value is part of the current configuration of the UE 122, the processing unit 502 may determine, based on the presence of the information element or value, that an SDAP entity is present for the PDU session indicated by the PDU session information element described above, and need not establish an SDAP entity (step S1106).

Then, the processing unit 502 of the UE 122 configures or reconfigures, in accordance with the SDAP configuration information element described above, the SDAP entity established as described above or an existing SDAP entity corresponding to the PDU session information element described above, and associates the radio bearer established in accordance with the radio bearer configuration element described above, with the SDAP entity established as described above or the existing SDAP entity corresponding to the PDU session information element described above, in accordance with the SDAP configuration information element described above. In other words, in step S1104, in a case that the PDU session information element included in the SDAP configuration information element described above is not part of the current configuration of the UE 122, the SDAP entity established as described above may be configured or reconfigured, and the radio bearer established in accordance with the radio bearer configuration element described above may be associated with the SDAP entity described above. In a case that the PDU session information element included in the SDAP configuration information element described above is part of the current configuration of the UE 122, the existing SDAP entity corresponding to the PDU session information element described above may be configured or reconfigured, and the radio bearer established in accordance with the radio bearer configuration element described above may be associated with the SDAP entity described above. Furthermore, the processing unit 502 of the UE 122 indicates to the upper layer that "user-plane resources have been established or configured for the PDU session corresponding to the PDU session information element described above." "User plane resources have been established or configured for the PDU session corresponding to the PDU session information element described above" may be referred to as "a mapping rule is stored that relates to the mapping between the radio bearer and the QoS flow corresponding to the QoS flow identifier information element included in the added QoS flow information element included in the SDAP configuration information element described above or the value of the QoS flow identifier information element."

Indicating that "user-plane resources have been established or configured for the PDU session corresponding to the PDU session information element described above" may be, for example, indicating to the upper layer the PDU session identifier information element described above or the value of the PDU session identifier information element. At this time, the QoS flow identifier information element described above or the value of the QoS flow identifier information element may be simultaneously indicated to the upper layer, or indicating to the upper layer the PDU session identifier information element described above or the value of the PDU session identifier information element described above may be replaced with indicating to the upper layer the QoS flow identifier information element described above or the value of the QoS identifier information element (step S1108).

Note that in Embodiment 2 of the present invention, the processing of indicating to the upper layer that "user-plane resources have been established or configured for the PDU session corresponding to the PDU session information element described above" may be performed by the RRC 308 or RRC 208, or may be performed by the SDAP 310. The upper layer indicated that "user-plane resources have been established or configured for the PDU session corresponding to the PDU session information element described above" may be the NAS layer. Indicating to the upper layer that "user-plane resources have been established or configured for the PDU session corresponding to the PDU session information element described above" may be performed after the RRC 308 or RRC 208 confirms the storage, in the SDAP 310, of the mapping rule for the mapping between the radio bearer and the QoS flow corresponding to the QoS flow identifier information element included in the added QoS flow information element or the value of the QoS flow identifier information element, the information element or value being included in the radio bearer configuration information element described above. A method for confirming the storage of the mapping rule described above may be an indication, from the SDAP 310 to the RRC 308 or RRC 208, of the storage of the mapping rule.

In this manner, in Embodiment 2 of the present invention, the upper layer receives an indication that user-plane resources have been established or configured for the PDU session, and the upper layer can detect that the user plane resources have been established for the PDU session in the lower layer, and transmit user data at the optimal timing. In other words, the terminal apparatus can reduce complexity of protocol processing to enable efficient communication.

The radio bearer configuration according to each embodiment of the present invention may be included not only in the RRC connection reconfiguration procedure but also in an RRC Establishment procedure or an RRC Re-Establishment procedure. The radio bearer in each embodiment of the present invention may be a DRB or an SRB.

Note that the "information element" in each embodiment of the present invention may be referred to as a "field."

In each embodiment of the present invention, indicating to the upper layer that "user-plane resources have been established for the PDU session corresponding to the PDU session information element described above" and/or that "user-plane resources have been established or configured for the PDU session corresponding to the PDU session information element" may be other information even in a case that the information is different from the replacement examples in the embodiments of the present invention as long as the information indicates that "user-plane resources have been established for the PDU session corresponding to the PDU session information element described above" and/or that "user-plane resources have been established or configured for the PDU session corresponding to the PDU session information element."

In each embodiment of the present invention, "the radio bearer configuration information element including an SDAP configuration information element" may refer to the non-use of EN-DC, i.e., the opposite of the use of EN-DC. This is because, in NR (New Radio technology), the EPC is used as the core network only in the case of EN-DC, as described in NPL 8 and NPL 9.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

The invention claimed is:

1. A terminal apparatus for communicating with a base station apparatus, the terminal apparatus comprising:
   reception circuitry configured to receive, from the base station apparatus, a Radio Resource Control (RRC) reconfiguration message including a radio bearer configuration information element; and
   processing circuitry configured to, based on a case that a radio bearer identity included in the radio bearer configuration information element is not part of a configuration of the terminal apparatus and that the radio bearer configuration information element includes a Service Data Adaptation Protocol (SDAP) configuration information element and that a value of a Protocol Data Unit (PDU) session information element included in the SDAP configuration information element is not part of the configuration of the terminal apparatus, indicate to upper layers that a user-plane resource is configured for a PDU session corresponding to the value of the PDU session information element.

2. The terminal apparatus according to claim 1, wherein the configuration of the user-plane resource includes a configuration related to a radio bearer.

3. A base station apparatus for communicating with a terminal apparatus, the base station apparatus comprising:
   transmission circuitry configured to transmit a Radio Resource Control (RRC) reconfiguration message to the terminal apparatus; and
   processing circuitry configured to include a radio bearer configuration information element in the RRC reconfiguration message to cause the terminal apparatus to perform processing, wherein
   the processing includes
   processing of, based on a case that a radio bearer identity included in the radio bearer configuration information element is not part of a configuration of the terminal apparatus and that the radio bearer configuration information element includes a Service Data Adaptation Protocol (SDAP) configuration information element and that a value of a Protocol Data Unit (PDU) session information element included in the SDAP configuration information element is not part of the configuration of the terminal apparatus, indicating to upper layers that a user-plane resource is configured for a PDU session corresponding to the value of the PDU session information element.

4. The base station apparatus according to claim 3, wherein
   the configuration of the user-plane resource includes a configuration related to a radio bearer.

5. A method for a terminal apparatus for communicating with a base station apparatus, the method comprising:
   receiving, from the base station apparatus, a Radio Resource Control (RRC) reconfiguration message including a radio bearer configuration information element; and
   based on a case that a radio bearer identity included in the radio bearer configuration information element is not part of a configuration of the terminal apparatus and that the radio bearer configuration information element includes a Service Data Adaptation Protocol (SDAP) configuration information element and that a value of a Protocol Data Unit (PDU) session information element included in the SDAP configuration information element is not part of the configuration of the terminal apparatus, indicating to upper layers that a user-plane resource is configured for a PDU session corresponding to the value of the PDU session information element.

6. A method for a base station apparatus for communicating with a terminal apparatus, the method comprising:
  transmitting an RRC reconfiguration message to the terminal apparatus; and
  including a radio bearer configuration information element in the RRC reconfiguration message to cause the terminal apparatus to perform processing, wherein
  the processing includes
  processing of, based on a case that a radio bearer identity included in the radio bearer configuration information element is not part of a configuration of the terminal apparatus and that the radio bearer configuration information element includes a Service Data Adaptation Protocol (SDAP) configuration information element and that a value of a Protocol Data Unit (PDU) session information element included in the SDAP configuration information element is not part of the configuration of the terminal apparatus, indicating to upper layers that a user-plane resource is configured for a PDU session corresponding to the value of the PDU session information element.

* * * * *